US010495829B1

(12) United States Patent
Squires

(10) Patent No.: US 10,495,829 B1
(45) Date of Patent: Dec. 3, 2019

(54) POSITIONING OF AN OPTICAL BEAM TO MITIGATE HYSTERESIS

(71) Applicant: Government of the United States, as represented by the Secretary of the Air Force, Kirtland AFB, NM (US)

(72) Inventor: Matthew Squires, Sandia Park, NM (US)

(73) Assignee: THE GOVERNMENT OF THE UNITED STATES OF AMERICA AS REPRESENTED BY THE SECRETARY OF THE AIR FORCE, Washington, DC (US)

( * ) Notice: Subject to any disclaimer, the term of this patent is extended or adjusted under 35 U.S.C. 154(b) by 0 days.

(21) Appl. No.: 15/904,695

(22) Filed: Feb. 26, 2018

(51) Int. Cl.
    *G02B 6/26* (2006.01)
    *G02B 6/42* (2006.01)

(52) U.S. Cl.
    CPC ......... *G02B 6/4225* (2013.01); *G02B 6/4206* (2013.01)

(58) Field of Classification Search
    USPC .................... 385/14, 20–25, 46–52
    See application file for complete search history.

(56) References Cited

U.S. PATENT DOCUMENTS

| 4,131,021 A * | 12/1978 | Mezrich | A61B 8/00 73/606 |
| 4,407,464 A | 10/1983 | Linick | |
| 6,549,700 B1 * | 4/2003 | Sweatt | G02B 6/3524 385/16 |
| 2005/0039370 A1 * | 2/2005 | Strong | F41G 1/473 42/130 |
| 2012/0170029 A1 * | 7/2012 | Azzazy | H01J 31/26 356/139.04 |

OTHER PUBLICATIONS https://www.newport.com/f/single-mode-fiber-couplers, downloaded from the internet on Nov. 2, 2017.
https://www.thorlabs.com/newgrouppage9.cfm?objectgroup_id=2940, downloaded from the internet on Nov. 2, 2017.
http://www.ozoptics.com/ALLNEW_PDF/DTS0136.pdf, downloaded from the internet on Nov. 2, 2017.
http://www.toptica.com/products/wavemeters-photonicals/photonicals/fiberdock/, downloaded from the internet on Nov. 2, 2017.

* cited by examiner

*Primary Examiner* — Eric Wong
(74) *Attorney, Agent, or Firm* — James M. Skorich

(57) ABSTRACT

A device for the positioning of an optical beam includes a housing and at least four prisms aligned for passing the optical beam therethrough, where each of the at least four prisms is movable relative to the housing. The device may also include one or more positioners engaged with the at least four prisms, the one or more positioners controllable to move the at least four prisms, where movement of the at least four prisms adjusts a position and an angle of the optical beam passed therethrough relative to an x-y plane.

19 Claims, 9 Drawing Sheets

POSITIONING OF AN OPTICAL BEAM TO MITIGATE HYSTERESIS

STATEMENT OF GOVERNMENT INTEREST

The invention described herein may be manufactured, used, and licensed by or for the Government of the United States for all governmental purposes without the payment of any royalty.

BACKGROUND OF THE INVENTION

There are a variety of applications where the positioning of an optical beam, or generally the steering of an optical beam, is used. For example, coupling laser light into a fiber optic is a fairly common practice when using fiber optics—e.g., coupling light into a fiber optic cable is a common practice in optics labs and in the fiber optic industry. Thus, a wide variety of environments (laboratory and otherwise) use lasers coupled into fiber optics, where this coupling is adjusted in such environments. In many of these applications, precise coupling is desired, but it is often difficult to achieve. For example, fiber optic coupling can be especially difficult when using a single-mode fiber, e.g., where the core of the fiber is less than about 10 microns in diameter, thus making the alignment of the light into the fiber an extremely sensitive undertaking, often needing less than a one-micron level of accuracy.

Fiber optic coupling may be achieved with an optical mount using a mechanical lead screw to adjust the position of a laser relative to a fiber optic cable. However, lead screws and similar mounts can lead to hysteresis and poor thermal performance in systems. Electronic actuators can be used with such screw drives and the like, but these devices and systems may still experience significant hysteresis.

There are also a variety of additional fiber coupling configurations, e.g., sold by most major optics vendors, but these can be quite costly, difficult to use, and can experience a great deal of hysteresis and poor thermal performance. In particular, there are several methods for fiber optic coupling that largely involve moving an optic mirror and/or lens to optimize laser power coupled into the fiber. However, because both the position and the angle of the laser into the fiber should be controlled, there is often a great deal of hysteresis using such complex setups.

In general, previous methods of fiber coupling can be grouped into two methods: (1) moving the beam relative to a fixed fiber optic, or (2) moving the fiber tip relative to the input light. As mentioned above, beam motion is most-often achieved using a pair of 'steering' mirrors that are mounted on tip/tilt mirror mounts. However, in such systems, the beam may be reflected multiple times, which can amplify angular errors from previous optical elements. The fiber tip may also or instead be moved relative to an input beam using, e.g., flexure mounts, translation stages, compressed springs, and so on. In such systems, the act of touching the alignment components may introduce a small change in position, which can lead to increased difficulty in achieving a precise and repeatable optical alignment. Thus, there remains a need for improved positioning of an optical beam, especially where precise positioning is desired.

BRIEF SUMMARY OF THE INVENTION

In an implementation, a device for positioning an optical beam includes a housing and at least four prisms aligned for passing the optical beam therethrough, where each of the at least four prisms is movable relative to the housing. The device may also include one or more positioners engaged with the at least four prisms, the one or more positioners controllable to move the at least four prisms, where movement of the at least four prisms adjusts a position and an angle of the optical beam passed therethrough relative to an x-y plane.

In an implementation, a system includes a housing, and at least four prisms aligned for passing an optical beam therethrough, where each of the at least four prisms is movable relative to the housing. The system may also include one or more positioners engaged with the at least four prisms, the one or more positioners structurally configured to move the at least four prisms, where movement of the at least four prisms adjusts a position and an angle of the optical beam passed therethrough relative to an x-y plane. The system may also include a controller including a processor and a memory, the controller in communication with the one or more positioners to selectively activate the one or more positioners to move one or more of the at least four prisms according to instructions.

In an implementation, a method includes aligning at least four prisms for passing an optical beam therethrough, where each of the at least four prisms is movable relative to a housing. The method may also include passing the optical beam through the at least four prisms, and adjusting a position and an angle of the optical beam by moving one or more of the at least four prisms relative to the housing.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
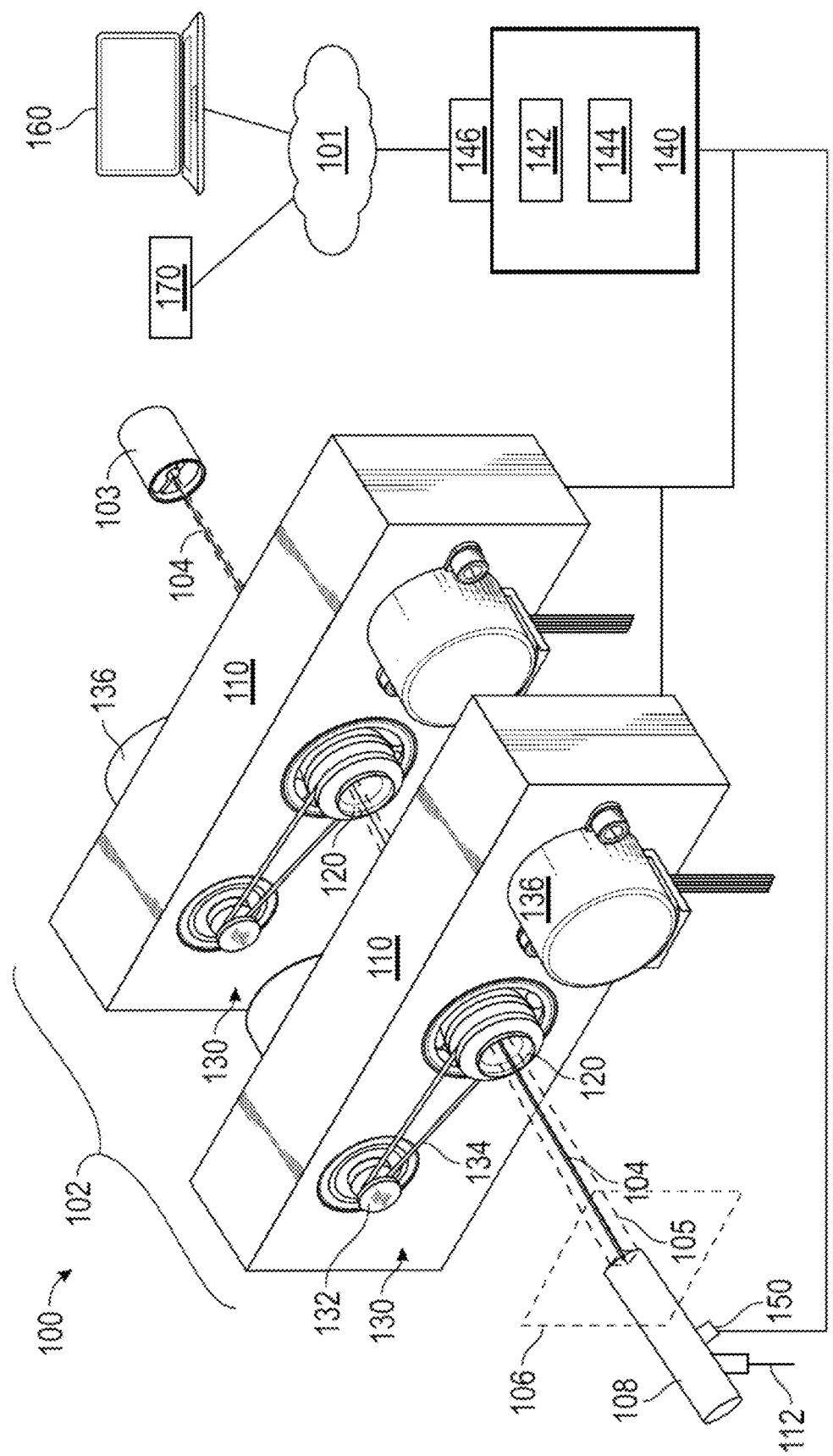
FIG. 1 illustrates a system for positioning an optical beam, in accordance with a representative embodiment.

The various methods, systems, apparatuses, and devices described herein may generally provide for the positioning of an optical beam, e.g., for coupling the optical beam with a target such as a fiber optic, although other positioning applications are also or instead possible.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In general, the devices, systems, and methods described herein may include the relatively precise positioning of an optical beam (e.g., a laser), e.g., to mitigate or eliminate hysteresis. For example, the present teachings may be used to couple a laser beam and a fiber optic in a precise manner that can mitigate or eliminate the hysteresis exhibited by devices and systems of the prior art such as those that include mirrors and screw-driven translators. Although the disclosure may emphasize fiber optic coupling, it will be understood that the present teachings may be used, or may be adapted for use, in a variety of applications including without limitation in optical tweezers, coupling light into optical cavities, and laser milling. Thus, while one of the purposes of the present teachings may be to provide a more stable and repeatable method for coupling light into a fiber optic cable, other techniques for positioning a beam, or beam steering, may also or instead be improved upon using the present teachings.

As stated above, coupling laser light into a fiber optic may involve moving an optic mirror or lens to optimize the laser power coupled into the fiber. In such coupling, both the position and the angle of the laser into the fiber should be controlled. Previously, wedge prisms (e.g., Risley prisms) have been used for beam steering, but only to determine the position of the beam at some distal point—i.e., not for adjusting a position and an angle of a beam. In contrast, the present teachings may utilize wedge prisms (e.g., Risley prisms) for positioning an optical beam, and more particularly, for adjusting the position (e.g., an x-y position on a plane) and an angle (e.g., an angle intersecting the aforementioned plane) of the optical beam. Specifically, the present teachings may utilize a plurality of wedge prisms (e.g., four wedge prisms) for the precise alignment of a laser into a fiber optic with control over both the position and angle of the laser into the fiber optic.

A brief discussion on wedge prisms and Risley prisms is provided below for context. In general, a wedge prism is a prism with a relatively shallow angle between its input and output surfaces, e.g., three degrees or less. Refraction at a surface may cause the prism to deflect light by a fixed angle. A pair of wedge prisms, sometimes called a Risley prism pair, can be used for beam steering. In this case, rotating one wedge prism in relation to the other can change the direction of a beam. For example, when the wedge prisms are angled in the same direction, the angle of the refracted beam becomes greater; and when the wedge prisms are rotated to angle in opposite directions, they can cancel each other out, where a beam is allowed to pass straight through. Moving a wedge prism either closer or farther away from a laser can also be used to steer a beam. For example, when a wedge prism is moved closer to the target (farther away from the laser), the refracted beam may move across the target.

Separate from fiber optic coupling, Risley prisms have been used for beam steering, but generally only to determine the position of the beam at a distal point. Previous Risley prism systems have also been used for beam scanning, and the present teachings may also have beam scanning applications, i.e., where the angle of the beam is controlled in addition to the position of the beam. Thus, previous versions of beam steering using Risley prisms have generally only determined/controlled a final position of a beam, and may have been used in light detection and ranging (LIDAR) applications, image projection applications, image alignment applications, object tracking applications, laser surgery applications, and so on. Thus, these systems may also or instead benefit from the present teachings, e.g., if it is desirous to control an angle of the beam in addition to the position.

In general, the present teachings may utilize Risley prisms for the positioning of an optical beam using both position and angle, e.g., four degrees of freedom. For example, the position of an optical beam may be controlled via the rotation of at least four wedge-shaped pieces of glass (e.g., two Risley prism pairs). This configuration may be advantageous because the rotation of the optics may be less sensitive to displacements of the tilt of the optics. Also, using only the rotation of the optics can provide stability, enabling the wedge angle of the prism to be very small. Also, using the present teachings, a laser may pass straight through the wedge prisms, where it is not subject to any additional angular errors, e.g., in other systems where the light reflects off of a mirror. In this manner, the present teachings can improve the thermal properties of a fiber coupling system, making the system more reproducible under thermal drifts. Also, a mechanism for holding the wedge prisms may be simplified, e.g., eliminating a need for precision lead screws with precision carriages having an appropriately selected stiffness.

Thus, in certain implementations, at least four wedge prisms are used to control at least two positions and at least two angles of an optical beam, where other systems use two or three wedge prisms to control two angles, which becomes two positions over some distance. For example, the third prism in other systems may be used to eliminate 'dead spots' in two prism configurations. The present teachings may also include a mathematical approximation that allows for the position and the angle to be solved for a multi-prism (e.g., four) system based on the angle of the wedge prism and the inverse solution to allow for a desired position and angle to be used to determine what rotation angle should be applied to the Risley prisms.

The present teachings may thus include holding wedge prisms, calculating a desired angle for the wedge prisms (e.g., based on a desired position and angle of an optical beam), and then rotating the wedge prisms to the desired angles—e.g., where the present teachings utilize at least four wedge prisms. The rotation of each wedge prism may be independent of the rotation for another wedge prism, but the wedge prisms may work in a coordinated manner with respect to the other wedge prisms. The present teachings may also include a mathematical description of an optimal angular relation between various wedge prisms. The present teachings may thus translate a desired linear and angular motion of the optical beam into appropriate rotation(s) of wedge prisms. The present teachings may also include measuring coupling of an optical beam into a target such as a fiber optic, e.g., such that optimal fiber coupling is achieved.

FIG. 1 illustrates a system 100 for positioning an optical beam 104, in accordance with a representative embodiment. The system 100 may include a device 102 for positioning an optical beam 104 and a controller 140. The device 102 may include a housing 110, one or more prisms 120, and one or more positioners 130.

The device 102 may be used to control and move the optical beam 104 using both position and angle, or otherwise position the optical beam 104 with four degrees of freedom. In general, the position and angle of the optical beam 104 may be controlled via rotation of the prisms 120 using the positioners 130. The device 102 may be used for any of the purposes and applications described herein or otherwise known in the art, including without limitation, for fiber optic coupling.

The optical beam 104 may include a laser beam or the like, or another beam of light. The area of motion 105 for the optical beam 104 through the system 100 is shown in the figure, although other areas of motions are certainly possible. In certain implementations, the area of motion 105 may increase for each prism 120 or Risley prism pair through which the optical beam 104 passes. The optical beam 104 may be provided by a beam source 103 such as a laser device or the like.

The housing 110 may include a single housing 110 or multiple housings 110 as shown in the figure. In general, the housing 110 may include any structure that supports, contains, or holds one or more of the components of the system 100. In certain implementations, the system 100 may include at least two housings 110, e.g., one for each Risley prism pair.

As stated above, the device 102 may include one or more prisms 120. Specifically, the device 102 may include at least four prisms 120 aligned for passing the optical beam 104 therethrough. In the figure, two of the four prisms 120 are shown, and it will be understood that each prism 120 shown in the figure may include a corresponding prism 120 disposed on an opposite side of the respective housing 110. It will also be understood that more than four prisms 120 may be included in certain implementations. However, in an implementation, the device 102 includes controlling the position and the angle of an optical beam 104 with only four prisms 120.

The prisms 120 may include any as described herein or otherwise known in the art. For example, one or more of the prisms 120 may include a wedge prism, e.g., each of the prisms 120 may include a wedge prism. The wedge prisms may generally include a wedged piece of glass. In certain implementations, at least four prisms 120 are provided, and these prisms 120 include at least two sets of at least two prisms 120. For example, there may be exactly four prisms 120 made up of two sets of Risley prism pairs. In this manner, the prisms 120 may be structurally configured to control at least two positions and at least two angles of the optical beam 104 passed therethrough, e.g., one for each Risley prism pair. Also, or instead, in certain implementations, movement of the prisms 120 may provide four degrees of freedom for the optical beam 104.

One or more of the prisms 120, e.g., each of the prisms 120, may be movable relative to the housing 110. To this end, the device 102 may include one or more positioners 130 engaged with one or more of the prisms 120, e.g., a positioner 130 engaged with each of the prisms 120. Thus, in general, the positioners 130 may include the components contained on or within the device 102 that move the prisms 120. The positioners 130 may be controllable to move each of the prisms 120, where movement of the prisms 120, individually and/or collectively, adjusts a position and an angle of the optical beam 104 passed therethrough relative to an x-y plane 106. The position and the angle are described, e.g., in more detail below with reference to FIGS. 4-8, but it will be understood that the position may generally include an x-y coordinate relative to an x-y plane 106 (or other target), and the angle may generally include an angle of the optical beam 104 passing through the x-y plane 106, where a 90-degree angle represents the optical beam 104 passing orthogonally through the x-y plane 106, i.e., having a vector normal to the x-y plane 106.

In the figure, two positioners 130 are shown, but it will be understood that more or less positioners 130 may be included in the system 100. For example, in certain implementations, only one positioner 130 is used to move all of the prisms 120, collectively or independently. In other implementations, each of the prisms 120 is engaged with its own individual positioner 130. Other combinations and configurations for the positioners 130 and prisms 120 are also or instead possible. Thus, in the device 102 or system 100, movement of different prisms 120 may be coordinated. Also, or instead, one or more of the prisms 120 may be structurally configured to be moved independently from another one of the prisms 120.

In certain implementations, the positioners 130 move each of the prisms 120 to align the optical beam 104 relative to a target 108. For example, the positioners 130 may move each of the prisms 120 to couple the optical beam 104 with the target 108. As discussed herein, the target 108 may include one or more of a single-mode fiber optic and a multi-mode fiber optic. For example, the target 108 may include a fiber optic, and the fiber optic may remain substantially stationary while the device 102 couples the optical beam 104 with the fiber optic. In this manner, unlike some other systems in the art, the system 100 may not move the fiber optic when coupling the optical beam 104 with the fiber optic. In other words, using techniques described herein, it may not be necessary to move the fiber optic during coupling because of the precise positioning, and the plurality of degrees of freedom, provided by the device 102 and system 100. To this end, the system 100 may include one or more stabilizers 112 for holding the fiber optic substantially stationary.

One or more of the prisms 120, e.g., each of the prisms 120, may be rotatable relative to the housing 110. In other words, rotation of the prisms 120 may adjust the position and the angle of the optical beam 104 passed therethrough. In certain implementations, one or more of the prisms 120, e.g., each of the prisms 120, may be mounted to the housing 110 such that rotation is the only movement of each prism 120 that is permitted. In this manner, the stability and movement of the prisms 120 can be more precisely controlled, and thus the position and the angle of the optical beam 104 can be more precisely controlled.

Thus, one or more of the positioners 130 may be structurally configured for rotating the prisms 120 in the device 102 or system 100. To this end, one or more of the positioners 130 may include a rotating gear 132 or the like, e.g., a rotating gear 132 engaged with a prism 120 using a belt 134 or the like. It will be understood that the rotating gear 132 may be otherwise engaged with the prism 120, and the positioners 130 shown in the figure are provided by way of example only, and not of limitation. Also, or instead, one or more of the positioners 130 may include a linear actuator or the like. The system 100 may further include a motor 136 structurally configured to drive one or more of the positioners 130. The motor 136 may include one or more stepper motors, encoded direct current (DC) motors, gears, belts 134, pulleys, worm gears, threads, bushings, bearings, and so forth. More generally, any such arrangement suitable for controllably moving the prisms 120 as described herein may be adapted to use with the system 100.

The system 100 may further include one or more sensors 150. For example, a sensor 150 provided in the system 100 may include a device for measuring optical power. Thus, in certain implementations, the sensor 150 may include a photodiode, a photosensor, a photodetector, and the like. The sensor 150 may also or instead include one or more of an optical sensor, a position sensor, a current sensor, a capacitive sensor, a photoelectric sensor, a charge-coupled device (CCD), an infrared sensor, an electro-optical sensor, and the like. The sensor 150 may also or instead be configured to measure coupling of the optical beam 104 into the target 108, such as a fiber optic.

The positioners 130 may be structurally configured to move the prisms 120, e.g., according to feedback received from the sensor 150. The sensor 150 may thus be in communication with the positioners 130 and/or the controller 140. For example, the sensor 150 may be in communication with the controller 140, which then sends a control signal to the positioners 130 for operation thereof according to feedback received from the sensor 150. Thus, the positioners 130 may move the prisms 120 according to a signal received from the controller 140.

The controller 140 may include a processor 142 and a memory 144, where the controller 140 is in communication with at least the positioners 130 to selectively activate the positioners 130 to move one or more of the prisms 120 according to instructions. The instructions may be provided by the processor 142 according to feedback received from one or more sensors 150, e.g., as described above. The instructions may also or instead be received from a computing device 160 over a data network 101.

The instructions may also or instead be based on a mathematical relationship of an angular relationship of the prisms 120. For example, the instructions may be based on a mathematical approximation derived from an angle of one or more of the prisms 120, and an inverse solution from a desired position and a desired angle of the optical beam 104. Various mathematical relationships are discussed herein, and any may be included as a basis generating the instructions.

An algorithm may determine the motion of the prisms 120 that is needed to achieve a desired position and a desired angle of the optical beam 104. Also, or instead, the algorithm may determine the position and the angle of the optical beam 104.

Turning back to the controller 140, the controller 140 may be used for controlling operation of one or more of the components of the system 100, e.g., the positioners 130, the beam source 103, the target 108, and so on. The controller 140 may include, or otherwise be in communication with, a processor 142 and a memory 144. The controller 140 may be electronically coupled (e.g., wired or wirelessly) in a communicating relationship with one or more of the components of the system 100. Thus, in an implementation, the controller 140 may include a processor 142 and a memory 144, where the processor 142 is configured to control one or more of the positioners 130 to position one or more of the prisms 120 according to one or more of sensor feedback, predetermined instructions, instructions based on algorithmic calculations, and the like.

As discussed above, the controller 140 may be operable to control the components of the system 100, where the controller 140 may include any combination of software and/or processing circuitry suitable for controlling the various components of the system 100 described herein including without limitation processors, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In certain implementations, the controller 140 may include the processor 142 or other processing circuitry with sufficient computational power to provide related functions such as executing an operating system, providing a graphical user interface (e.g., to a display coupled to the controller 140 or another component of the system 100), set and provide rules and instructions for operation of the device 102 or another component of the system 100, convert sensed information into positioning or other instructions, and operate a web server or otherwise host remote operators and/or activity through the communications interface 146 such as that described below. In certain implementations, the controller 140 may include a printed circuit board, an Arduino controller or similar, a Raspberry Pi controller or the like, a prototyping board, or other computer related components.

The controller 140 may be a local controller disposed on the device 102, or a remote controller 140 otherwise in communication with the device 102 and its components. For example, one or more of the controller 140 and a user interface in communication with the controller 140 may be disposed on an external component (e.g., a computing device 160) in communication with the device 102 over a data network 101.

The processor 142 of the controller 140 may include an onboard processor for the device 102. The processor 142 may also or instead be disposed on a separate computing device 160 that is connected to the device 102 through a data network 101, e.g., using the communications interface 146, which may include a Wi-Fi transmitter and receiver. The processor 142 may perform calculations for positioning of the prisms 120 for controlling a position and an angle of the optical beam 104.

The processor 142 may be any as described herein or otherwise known in the art. The processor 142 may be included on the controller 140, or it may be separate from the controller 140, e.g., it may be included on a computing device 160 in communication with the controller 140 or another component of the system 100. In an implementation, the processor 142 is included on or in communication with a server that hosts an application for operating and controlling the system 100.

The memory 144 may be any as described herein or otherwise known in the art. The memory 144 may contain computer code and may store data such as sequences of actuation or movement of the positioners 130 or prisms 120 in general. The memory 144 may contain computer executable code stored thereon that provides instructions for the processor 142 for implementation. The memory 144 may include a non-transitory computer readable medium.

The system 100 may include a computing device 160 in communication with one or more of the components of the system 100 including without limitation the controller 140. The computing device 160 may include any components within the system 100 operated by operators or otherwise to manage, monitor, communicate with, or otherwise interact with other participants in the system 100. This may include desktop computers, laptop computers, network computers, tablets, smartphones, smart watches, PDAs, or any other device that can participate in the system 100 as contemplated herein. In an implementation, the computing device 160 (and a user interface thereof) is integral with another participant in the system 100.

The data network 101 may be any network(s) or internetwork(s) suitable for communicating data and control information among participants in the system 100. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m) and/or other technologies, as well as any of a variety of corporate area or local area networks and other switches, routers, hubs, gateways, and the like that might be used to carry data among participants in the system 100. The data network 101 may include wired or wireless networks, or any combination thereof. One skilled in the art will also recognize that the participants shown the system 100 need not be connected by a data network 101, and thus can be configured to work in conjunction with other participants independent of the data network 101.

Communication over the data network 101, or other communication between components of the system 100 described herein, may be provided via one or more communications interfaces 146. The communications interface 146 may include, e.g., a Wi-Fi receiver and transmitter to allow the logic calculations to be performed on a separate computing device 160. This may include connections to smartphone applications and the like. More generally, the communications interface 146 may be suited such that any of the components of the system 100 can communicate with one another. Thus, the communications interface 146 may be present on one or more of the components of the system 100. The communications interface 146 may include, or be connected in a communicating relationship with, a network interface or the like. The communications interface 146 may include any combination of hardware and software suitable for coupling the components of the system 100 to a remote device (e.g., a computing device 160 such as a remote computer or the like) in a communicating relationship through a data network 101. By way of example and not limitation, this may include electronics for a wired or wireless Ethernet connection operating according to the IEEE 802.11 standard (or any variation thereof), or any other short or long-range wireless networking components or the like. This may include hardware for short-range data communications such as Bluetooth or an infrared transceiver, which may be used to couple into a local area network or the like that is in turn coupled to a data network 101 such as the internet. This may also or instead include hardware/software for a WiMAX connection or a cellular network connection (using, e.g., CDMA, GSM, LTE, or any other suitable protocol or combination of protocols). Additionally, the controller 140 may be configured to control participation by the components of the system 100 in any network to which the communications interface 146 is connected, such as by autonomously connecting to the data network 101 to retrieve status updates and the like.

The system 100 may include other hardware 170. In certain implementations, the other hardware 170 may include a camera or other sensors such as those described above. The other hardware 170 may also or instead include a power source. The other hardware 170 may also or instead include input devices such as a keyboard, a touchpad, a computer mouse, a switch, a dial, a button, and the like, as well as output devices such as a display, a speaker or other audio transducer, light emitting diodes or other lighting or display components, and the like. Other hardware 170 of system 100 may also or instead include a variety of cable connections and/or hardware adapters for connecting to, e.g., external computers, external hardware, external instrumentation or data acquisition systems, and the like.

It will be understood that, because of the configuration of the device 102 and system 100 as shown and described above, devices 102 and systems 100 may work without the assistance of mirrors. Thus, the device 102 or system 100 may completely lack mirrors. This may help mitigate or eliminate hysteresis or other errors in the device 102 or system 100.

Figure 2:
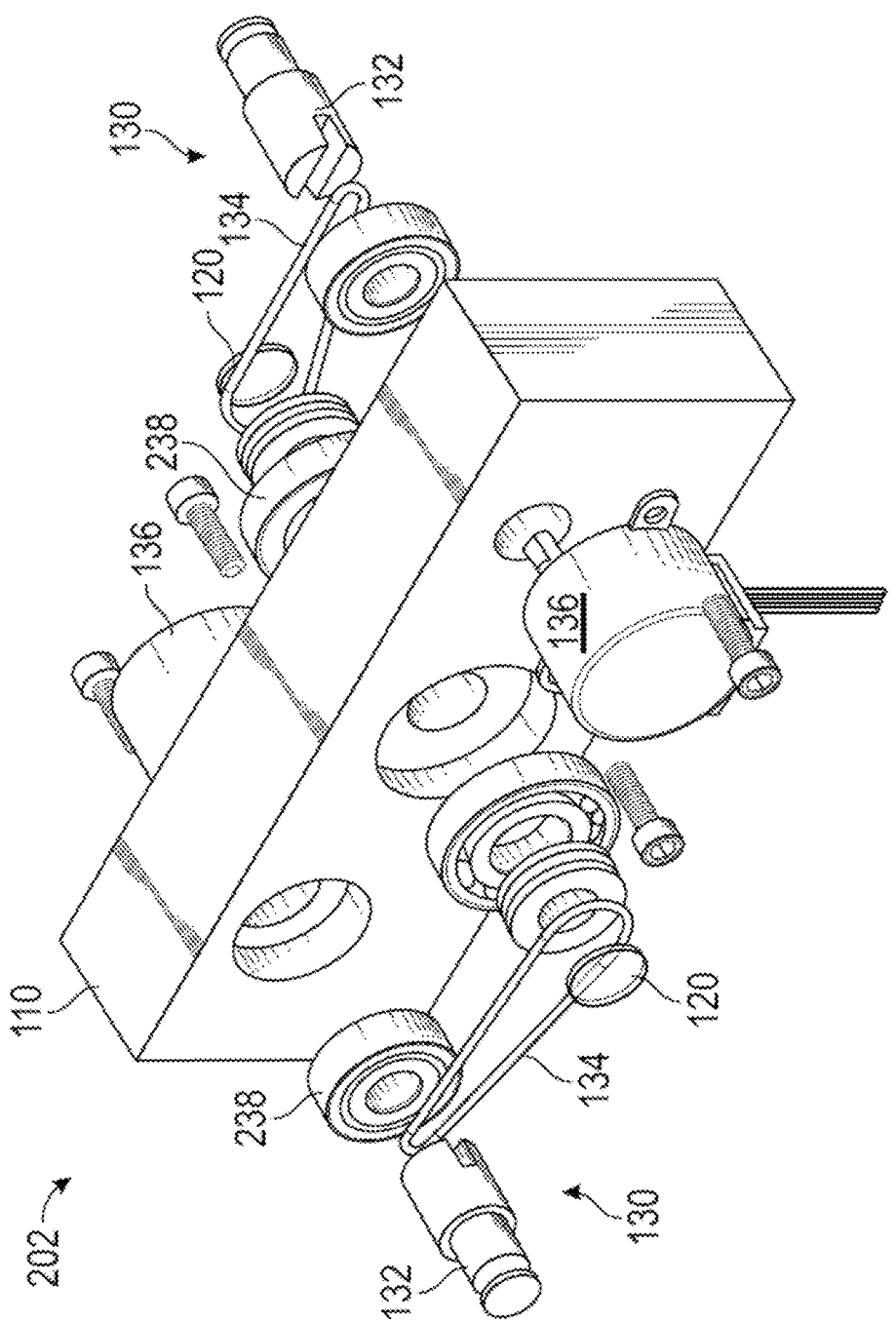
FIG. 2 illustrates an exploded view of a device for positioning an optical beam, in accordance with a representative embodiment.

FIG. 2 illustrates an exploded view of a device 202 for positioning an optical beam, in accordance with a representative embodiment. The device 202 may be the same or similar to that shown above, or a portion of the device 102 shown above, e.g., only including a single pair of prisms 120 such as a Risley prism pair. Thus, the device 202 shown in FIG. 2 may illustrate an exploded view of a portion of the device 102 shown above in FIG. 1. In addition, FIG. 2 clearly shows the housing 110, the prisms 120, the positioners 130, the rotating gears 132, the belts 134, and the motors 136. The figure also shows various bearings 238 to facilitate rotation of components of the device 202, such as the rotating gear 132 and the prisms 120. Similar to the device 102 shown above in FIG. 1, the positioners 130 in the device 202 shown in FIG. 2 may generally include the components contained on or within the device 202 that move the prisms 120.

Figure 3:
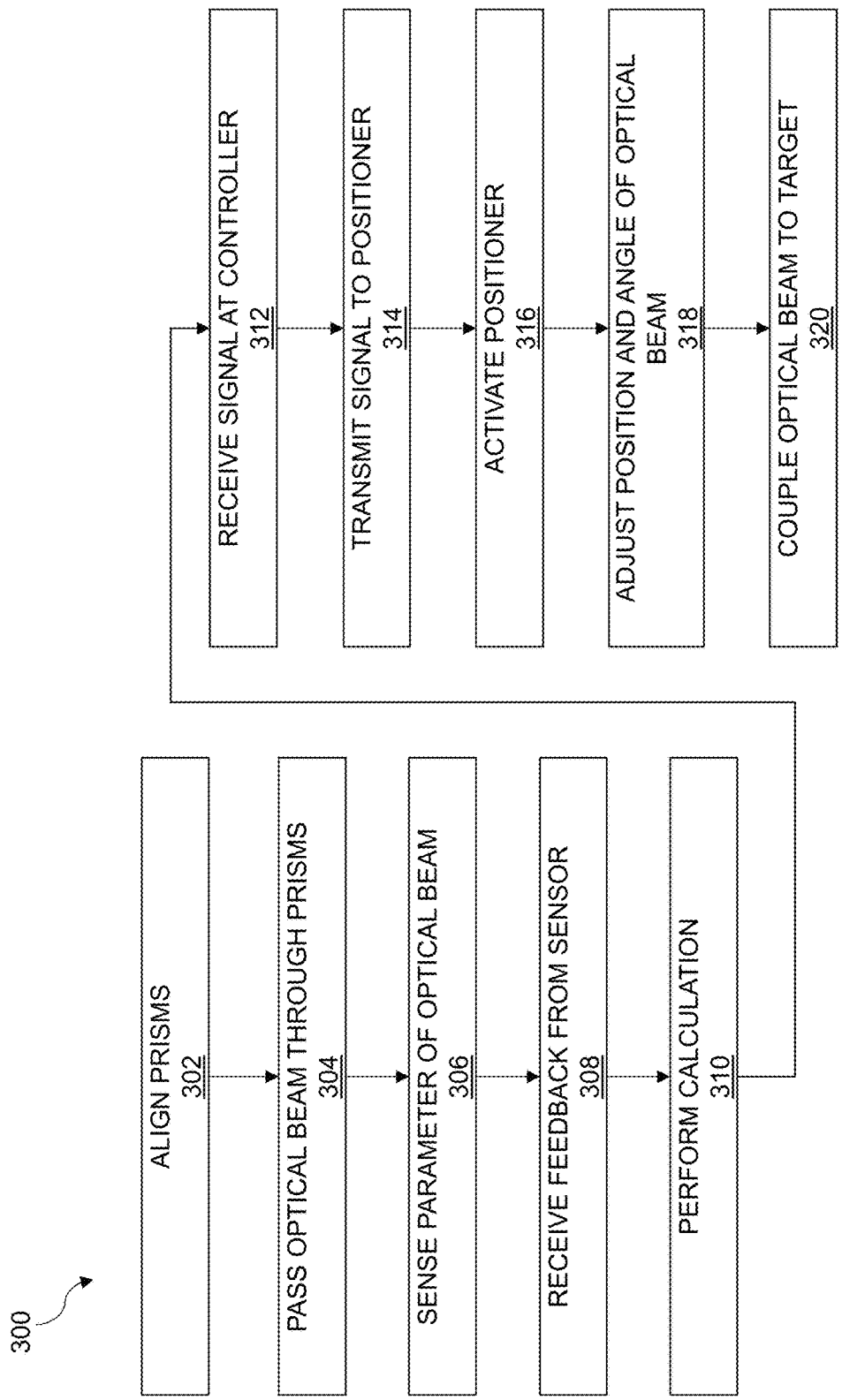
FIG. 3 is a flow chart of a method for positioning an optical beam, in accordance with a representative embodiment.

FIG. 3 is a flow chart of a method for positioning an optical beam, in accordance with a representative embodiment. The method 300 may be performed using any of the devices and systems described herein. In general, the method 300 may provide for the positioning of an optical beam, and more specifically, adjusting a position and an angle of the optical beam by moving one or more of at least four prisms.

As shown in block 302, the method 300 may include aligning a plurality of prisms. For example, the method 300 may include aligning at least four prisms for passing an optical beam therethrough, where each of the prisms is movable relative to a housing.

As shown in block 304, the method 300 may include passing the optical beam through the prisms, e.g., passing the optical beam through at least four prisms.

As shown in block 306, the method 300 may include sensing a parameter of the optical beam using one or more sensors. In certain implementations, the sensed parameter is the optical power of the optical beam at a specific location. In this manner, the sensor may include a photodiode or the like, used to measure optical power.

As shown in block 308, the method 300 may include receiving feedback from one or more sensors. The feedback may be received at a controller, such as any as described herein. The feedback may at least partially provide a basis for instructions related to one or more of (i) the position and the angle of the optical beam, (ii) a position of one or more of the prisms, and (iii) a parameter of the optical beam. In certain implementations, a system may include direct feedback to the controller, where the alignment is automatic. In other implementations, a user may provide the controller with inputs corresponding to linear motion of the output beam. The controller may then convert the desired motion (or angular adjustment) into the appropriate rotation (motion) of one or more of the prisms.

As shown in block 310, the method 300 may include performing a calculation, e.g., of a current position and an angle of the optical beam, of a desired position and an angle of the optical beam, of a position and an angle of the optical beam based on positions or movement of one or more of the positioners, a position for one or more of the positioners, and so on. For example, the method 300 may include calculating an angle of one or more of at least four prisms based on a desired position and a desired angle of the optical beam. The method 300 may also or instead include calculating the position and the angle of the optical beam based on a position of one or more of at least four prisms.

Thus, the method 300 may include approximating a position along an x-y plane of an optical beam relative to a rotation of one or more of a plurality of prisms, e.g., where a first prism is rotated by angle alpha, a second prism is rotated by angle beta, and so on. The method 300 may also include approximating an angle intersecting an x-y plane of an optical beam relative to a rotation of one or more of a plurality of prisms, e.g., where a first prism is rotated by angle alpha prime, a second prism is rotated by angle beta prime, and so on.

As shown in block 312, the method 300 may include receiving a signal at the controller. The controller may thus receive and send signals in a system as contemplated herein. For example, and as described in blocks below, the controller may transmit a first signal to one or more positioners to move one or more prisms, where the transmission is based on, at least in part, a second signal received by the controller. The second signal may at least partially provide a basis for instructions related to one or more of (i) the position and the angle of the optical beam, (ii) a position of one or more of the prisms, and (iii) a parameter of the optical beam. The second signal may also or instead include such instructions. The second signal may also or instead be based on an algorithm that determines motion of one or more of the prisms to achieve a desired position and a desired angle of the optical beam, or vice-versa.

In some implementations, the signal received by the controller, e.g., the second signal, is received from a computing device over a data network. The second signal may also or instead be received by a sensor or the like. The second signal may also or instead be received by user input.

As shown in block 314, the method 300 may include transmitting, with the controller, a first signal to one or more positioners to move one or more of the prisms. This may also or instead be performed by a computing device as described herein.

As shown in block 316, the method 300 may include selectively activating one or more positioners to move one or more of the prisms.

As shown in block 318, the method 300 may include adjusting a position and an angle of the optical beam by moving one or more of the prisms relative to the housing.

As shown in block 320, the method 300 may include coupling the optical beam with a target such as a fiber optic through adjustment of the position and the angle of the optical beam.

A brief discussion of the mathematical relationships, and the angular relationships of Risley prisms, is provided below by way of example.

Ray transfer matrices for Risley prisms will now be discussed, including a discussion on augmented matrices.

Ray transfer matrices may be a preferred way to model optical systems. Many basic optical components have a simple ABCD matrix to describe them. When optical systems contain many different components, if all of the associated ABCD matrices are known, it is possible to describe the final refracted beam's linear and angular position in terms of the equivalent set of ray transfer matrices and the incident beam's linear and angular position.

Figure 4:
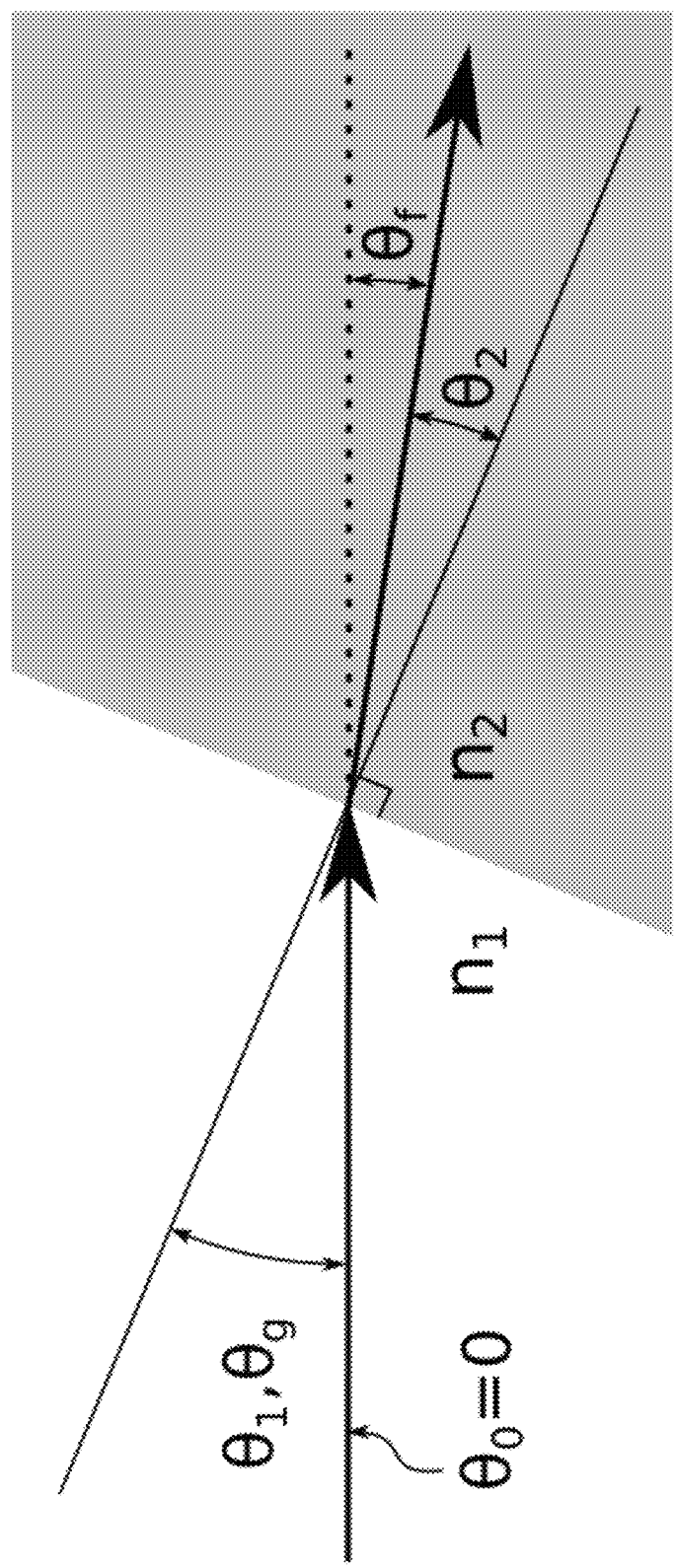
FIG. 4 illustrates a tilted index of refraction.

FIG. 4 illustrates a tilted index of refraction, and more specifically, a schematic diagram of a tilted index of refraction for a ray transfer matrix with an input ray with $\theta_0=0$ for derivation and comparison to Snell's law of refraction.

A ray transfer matrix description of a tilted planar index of refraction may be used to create a wedge prism and is a building block in Risley prism systems described herein. The tilted index of refraction is comprised of three matrices. The first matrix rotates the system such that it removes the angle of the interface so that the standard index of refraction ray transfer matrix can be used. The third matrix rotates the system back into the original orientation.

$$\begin{bmatrix} d_f \\ \theta_f \\ 1 \end{bmatrix} = \begin{bmatrix} 1 & 0 & 0 \\ 0 & 1 & \theta_g \\ 0 & 0 & 1 \end{bmatrix} \begin{bmatrix} 1 & 0 & 0 \\ 0 & \frac{n_1}{n_2} & 0 \\ 0 & 0 & 1 \end{bmatrix} \begin{bmatrix} 1 & 0 & 0 \\ 0 & 1 & -\theta_g \\ 0 & 0 & 1 \end{bmatrix} \begin{bmatrix} d_0 \\ \theta_0 \\ 1 \end{bmatrix} \quad (1)$$

where n is the index of refraction of materials and $\theta_g$ is the angle of the interface. Thus, the matrix for a rotated index of refraction and the matrix outputs are:

$$\begin{bmatrix} d_f \\ \theta_f \\ 1 \end{bmatrix} = \begin{bmatrix} 1 & 0 & 0 \\ 0 & \frac{n_1}{n_2} & \theta_g - \frac{n_1}{n_2}\theta_g \\ 0 & 0 & 1 \end{bmatrix} \begin{bmatrix} d_0 \\ \theta_0 \\ 1 \end{bmatrix} \quad (2)$$

$$= \begin{bmatrix} d_0 \\ \frac{n_1}{n_2}\theta_0 + \theta_g\left(1 - \frac{n_1}{n_2}\right) \\ 1 \end{bmatrix} \quad (3)$$

The angled index of refraction matrix may be verified with a few test cases. First, there is no change in the position, which is expected at an interface, i.e., $d_f=d_0$. Second, when the angle of the input ray is equal to the angle of the interface then there should be no refraction, i.e., $\theta_g=\theta_0$. If that is the case then $$\theta_f = \frac{n_1}{n_2}\theta_0 + \theta_0\left(\frac{n_1}{n_2} - 1\right) = \theta_0.$$

The third case is when the input ray has no angle but the angle of the interface is tilted, akin to being equivalent to Snell's law but with angles defined in the context of ray transfer matrices $$\theta_f = \theta_g\left(1 - \frac{n_1}{n_2}\right)$$

(see FIG. 4), which is equivalent to the small angle approximation of Snell's law.

A range of validity will now be discussed by way of example. For determining what the range of the wedge angles should be to maintain the paraxial approximation of ABCD matrices, it may be determined what is the maximum angle obtained out of a Risley prism pair. The paraxial approximation may be fairly accurate out to 10 degrees of a wedge, and somewhat accurate out to 20 degrees.

Figure 5:
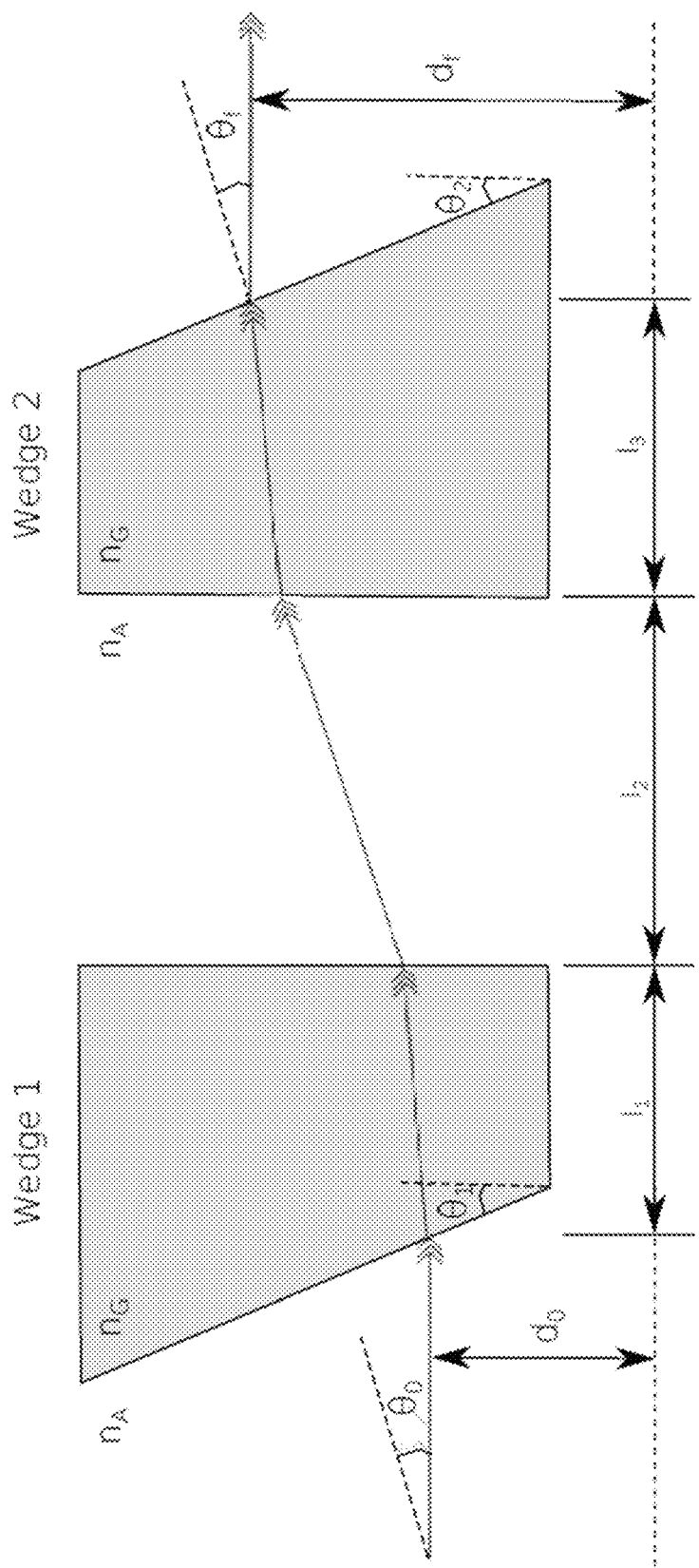
FIG. 5 illustrates a Risley prism pair.
Figure 6A:
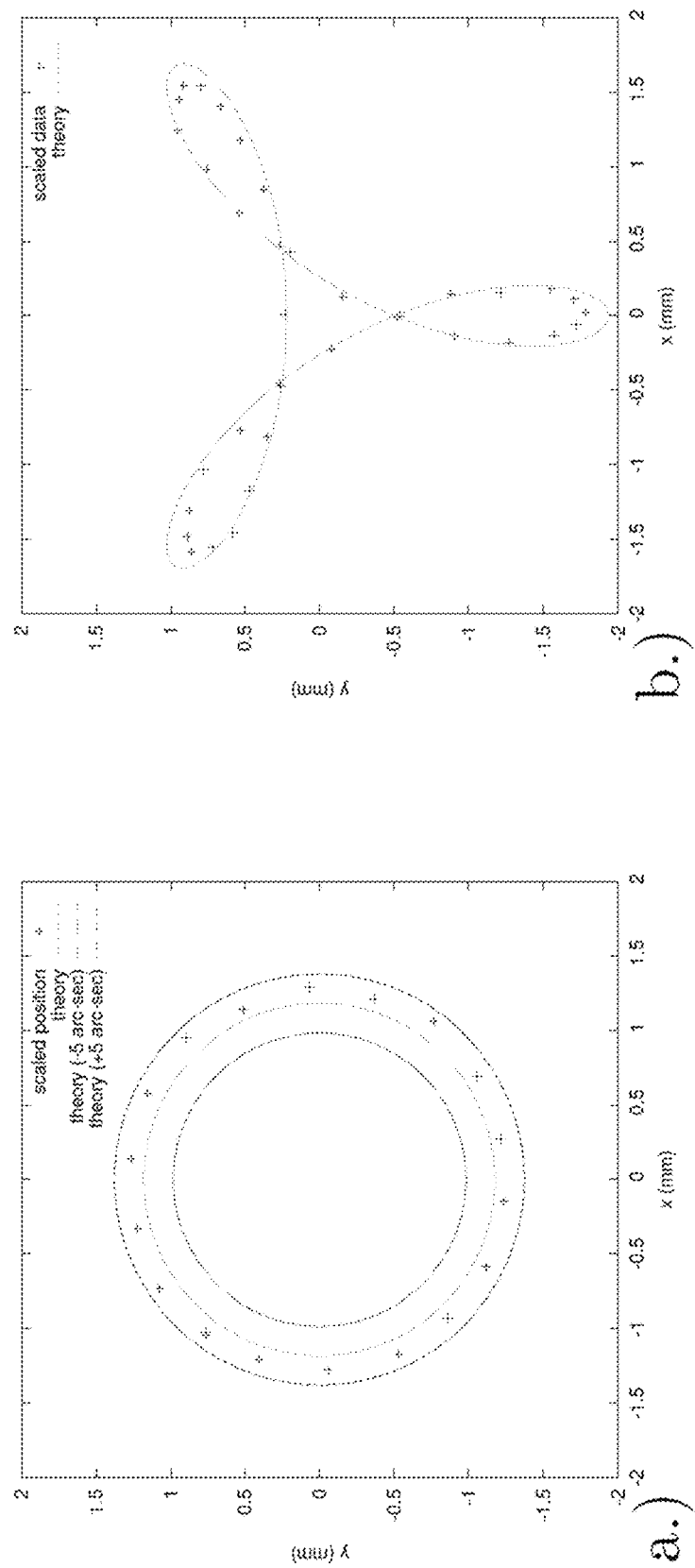
FIGS. 6A and 6B illustrate a comparison of Risley prism pair augmented ray matrices with experimental output positions as recorded by CCD camera.
Figure 6B:
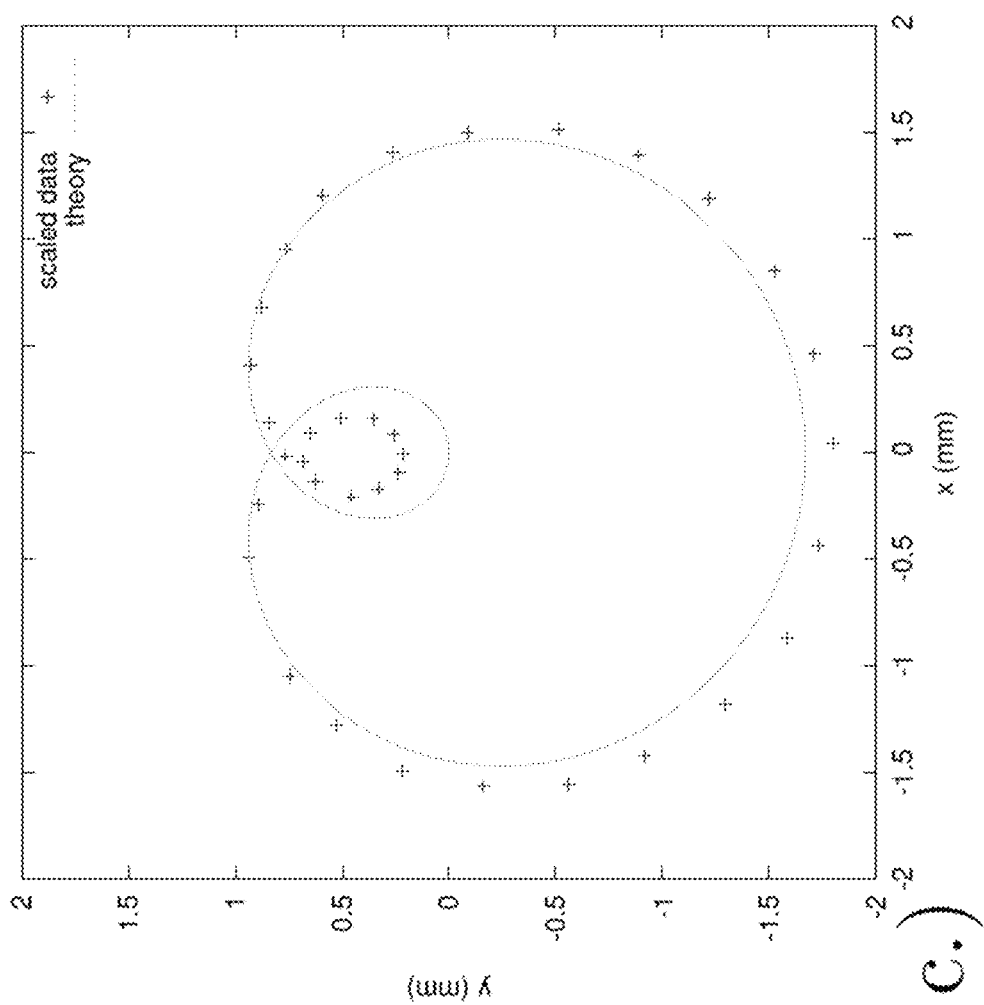

FIG. 5 illustrates a Risley prism pair, and FIGS. 6A and 6B illustrate a comparison of Risley prism pair augmented ray matrices with experimental output positions as recorded by CCD camera, where a.) $\theta_2=\theta_1$. The additonal contours are based on the 10 arc-min tolerance of the wedge angle, where b.) $\theta_2=-2\theta_1$ and c.) $\theta_2=\theta_1$.

There are two augmented matrices for a single wedge prism, which is a combination of a tilted plate ray transfer matrix, a translation ray transfer matrix, and the flat surface ray transfer matrix. The two versions depend on the order of the flat and angled interfaces relative to the incoming ray (e.g., Wedge 1 versus Wedge 2 in FIG. 5).

Assuming the glass prisms are surrounded by air with n=1, the augmented ray matrix for the flat first matrix is:

$$\begin{bmatrix} 1 & l/n & 0 \\ 0 & 1 & -\theta' \\ 0 & 0 & 1 \end{bmatrix} \quad (4)$$

and the augmented ray matrix for the angled first matrix is:

$$\begin{bmatrix} 1 & l/n & \theta'l/n \\ 0 & 1 & \theta' \\ 0 & 0 & 1 \end{bmatrix} \quad (5)$$

where $\theta'=\theta_g(n-1)$ is the effective angle of the glass that depends on the index of refraction n of the glass and the wedge angle $\theta_g$ of the glass. The thickness of the glass wedge is l and is assumed to be a constant. The path of the ray through the glass is assumed to be a fixed distance l which is valid if $\theta_g$ is small or if the displacement d is small. It is assumed that this approximation is on the same order of the paraxial assumption of ray transfer matrices (i.e., sin $\theta \approx \theta$).

The double wedge prism is the Risley prism configuration and is a combination of an angled first matrix, a translation matrix, and a flat first matrix:

$$\begin{bmatrix} 1 & D + \frac{2l}{n} & \frac{T_1}{n}(Dn+2l) \\ 0 & 1 & T_1 - T_2 \\ 0 & 0 & 1 \end{bmatrix} \quad (6)$$

The Risley prism changes the beam properties along two axes, which is expressed as two augmented ray matrices for each principle axis where the $\theta_g$'s are coupled angles, i.e., rotating the angle of the wedge prism will change the effective angle of the prism as:

$$\theta_{xn}=\theta_g' \sin(\phi_n)$$

$$\theta_{yn}=\theta_g' \sin(\phi_n),$$

where $\phi_n$ is the rotation angle of the nth wedge prism. The x and y output positions of a beam launched into a Risley pair system with $d_0=0$ and $\theta_0=0$ and an additional propagation distance $d_2$ is:

$$x(\phi_1,\phi_2)=\theta'((d+l/n)\sin(\phi_2)-(d+l/n+D)\sin(\phi_1))$$

$$y(\phi_1,\phi_2)=\theta'((d+l/n)\cos(\phi_2)-(d+l/n+D)\cos(\phi_1)).$$

The final position of the beam may be a case where $\phi_2$ is rotated at five times the rate of $\phi_1$.

Other mathematical relationships of the angular relationship of prisms (e.g., four prisms) are provided below by way of example.

An input vector may be represented by:

$$\begin{bmatrix} 0 \\ 0 \\ 1 \end{bmatrix}$$

A flat plate at an arbitrary angle may be represented by:

$$\begin{bmatrix} 1 & \frac{l}{nG} & \frac{Tl}{nG}(nG-1) \\ 0 & 1 & 0 \\ 0 & 0 & 1 \end{bmatrix}$$

A flat first prism may be represented by:

$$\begin{bmatrix} 1 & \frac{l}{nG} & 0 \\ 0 & 1 & -TnP \\ 0 & 0 & 1 \end{bmatrix}$$

An angled first prism may be represented by:

$$\begin{bmatrix} 1 & \frac{l}{nG} & \frac{Tl}{nG}nP \\ 0 & 1 & TnP \\ 0 & 0 & 1 \end{bmatrix}$$

A Risley pair with flats together may be represented by:

$$\begin{bmatrix} 1 & D + \frac{2l}{nG} & \frac{T_1 nP}{nG}(DnG + 2l) \\ 0 & 1 & nP(T_1 - T_2) \\ 0 & 0 & 1 \end{bmatrix}$$

Some substitutions may be made to simplify the Risley matrix:

$$\begin{bmatrix} 1 & D + \frac{2l}{nG} & \frac{T_1 nP}{nG}(DnG + 2l) \\ 0 & 1 & nP(T_1 - T_2) \\ 0 & 0 & 1 \end{bmatrix}$$

with an additional distance d to the screen/target:

$$\begin{bmatrix} 1 & D + d + \frac{2l}{nG} & \frac{nP}{nG}(T_1(DnG + 2l) + dnG(T_1 - T_2)) \\ 0 & 1 & nP(T_1 - T_2) \\ 0 & 0 & 1 \end{bmatrix}$$

The quad Risley set, separated by Dns may be represented by:

$$\begin{bmatrix} 1 & D_1 + D_2 + D_3 + \frac{4l}{nG} & \frac{nP}{nG}(T_1(4l + nG(D_1 + D_2 + D_3)) - T_2(2l + nG(D_2 + D_3)) + T_3(D_3 nG 2l)) \\ 0 & 1 & nP(T_1 - T_2 + T_3 - T_4) \\ 0 & 0 & 1 \end{bmatrix}$$

If it is assumed that the Ds are all equal:

$$\begin{bmatrix} 1 & 3D + \frac{4l}{nG} & \frac{nP}{nG}(T_1 l + 3T_1(DnG + l) - 2T_2(DnG + l) + T_3 l + T_3(DnG + l)) \\ 0 & 1 & nP(T_1 - T_2 + T_3 - T_4) \\ 0 & 0 & 1 \end{bmatrix}$$

First, one may look at gathering coefficients for later inversion.

First propagate to endpoint:

$$\begin{bmatrix} 1 & 3D + d + \frac{4l}{nG} & \frac{nP}{nG}((T_1 + T_3)l + (3T_1 - 2T_2 + T_3)(DnG + l) + dnG(T_1 - T_2 + T_3 - T_4)) \\ 0 & 1 & nP(T_1 - T_2 + T_3 - T_4) \\ 0 & 0 & 1 \end{bmatrix}$$

The output position in one axis is present, but there is no trig function yet.

The position output may be represented by:

$$\frac{nP}{nG}(T_1 l + 3T_1(DnG + l) - 2T_2(DnG + l) + T_3 l + T_3(DnG + l) + dnG(T_1 - T_2 + T_3 - T_4))$$

Prior to approximations RQtrigx may be represented by:

$$\frac{nP}{nG}(T_1 l + 3T_1(DnG + l) - 2T_2(DnG + l) + T_3 l + T_3(DnG + l) + dnG(T_1 - T_2 + T_3 - T_4))$$

Print the matrix with no expansions as:

$$\begin{bmatrix} \frac{nP}{nG}(4l + nG(3D + d)) & -\frac{nP}{nG}(2l + nG(2D + d)) & \frac{nP}{nG}(2l + nG(D + d)) & -dnP \\ nP & -nP & nP & -nP \\ \frac{nP}{nG}(4l + nG(3D + d)) & -\frac{nP}{nG}(2l + nG(2D + d)) & \frac{nP}{nG}(2l + nG(D + d)) & -dnP \\ nP & -nP & nP & -nP \end{bmatrix}$$

Substitution and series expansion.

This is the expansion of sin(x) at pi/4 to substitute in for sin(x).

This is the expansion of cos(x) at pi/4 to substitute in for sin(x).

The 4×4 matrix may be represented by:

$$\begin{bmatrix} \frac{TgnP}{nG}(4l+nG(3D+d)) & -\frac{TgnP}{nG}(2l+nG(2D+d)) & -\frac{Tg\delta}{nG}nP(2l+nG(D+d)) & Tgd\delta nP \\ TgnP & -TgnP & -TgnP & Tg\delta nP \\ -\frac{TgnP}{nG}nP(4l+nG(3D+d)) & \frac{TgnP}{nG}nP(2l+nG(2D+d)) & \frac{Tgn\delta}{nG}(2l+nG(D+d)) & -TgdnP \\ -Tg\delta nP & Tg\delta nP & TgnP & -TgnP \end{bmatrix}$$

Figure 7:
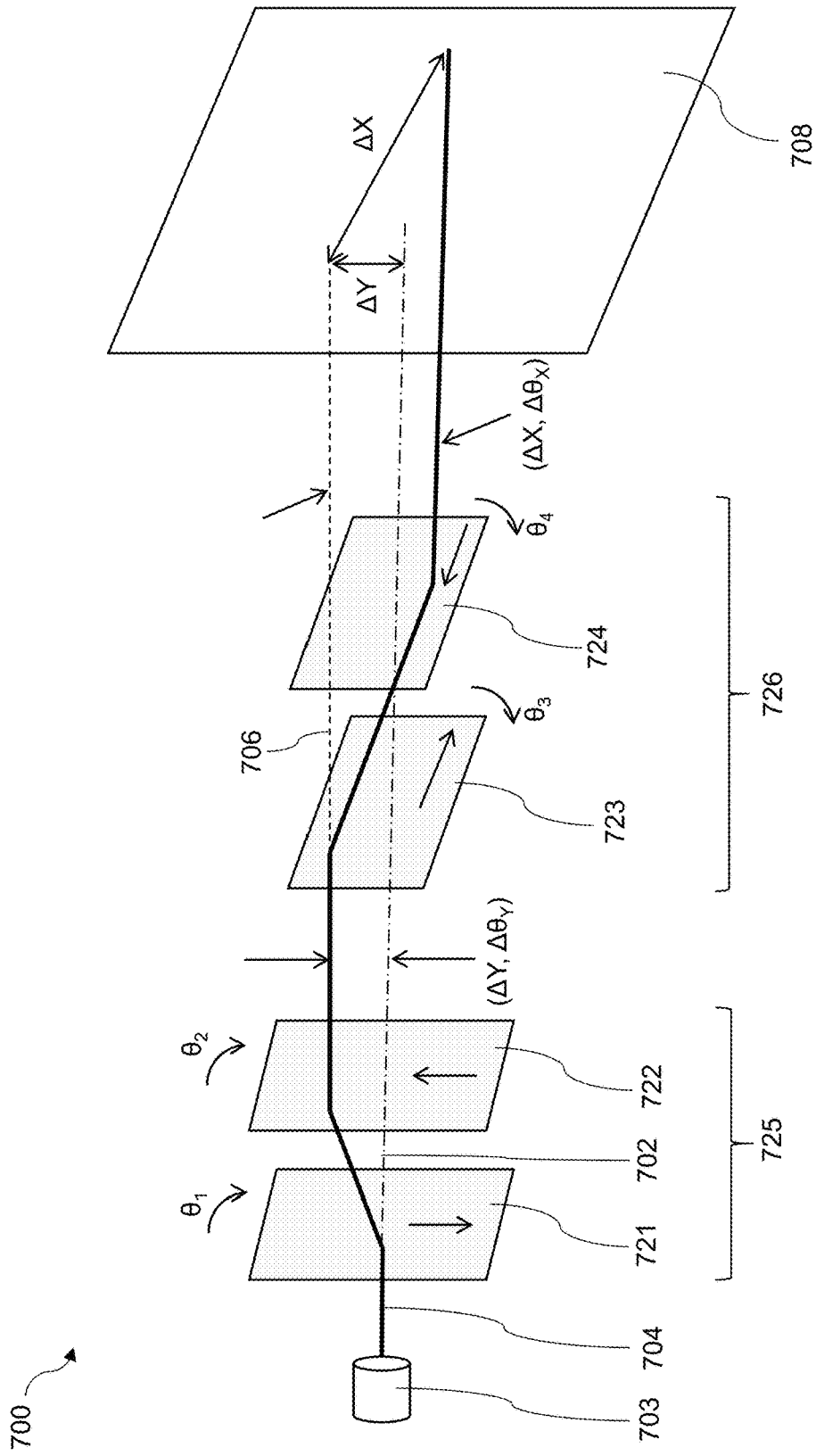
FIG. 7 illustrates a system for positioning an optical beam, in accordance with a representative embodiment.

FIG. 7 illustrates a system 700 for positioning an optical beam 704, in accordance with a representative embodiment. As shown in the figure, this representative system 700 includes a beam source 703, four prisms (e.g., two Risley prism pairs), and a target 708.

The four prisms may include a first prism 721, a second prism 722, a third prism 723, and a fourth prism 724, where each is capable of being manipulated (e.g., rotated) for positioning a position and an angle of the optical beam 704 from the beam source 703. The first prism 721 may include an angle $\theta_1$ between its input and output surfaces (or it may otherwise be capable of deflecting an optical beam 704 by a deflection of angle $\theta_1$), the second prism 722 may include an angle $\theta_2$ between its input and output surfaces (or it may otherwise be capable of deflecting an optical beam 704 by a deflection of angle $\theta_2$), the third prism 723 may include an angle $\theta_3$ between its input and output surfaces (or it may otherwise be capable of deflecting an optical beam 704 by a deflection of angle $\theta_3$), and the fourth prism 724 may include an angle $\theta_4$ between its input and output surfaces (or it may otherwise be capable of deflecting an optical beam 704 by a deflection of angle $\theta_4$).

As shown in the figure, after exiting the first set 725 of prisms, the optical beam 704 may be repositioned to a new position and angle relative to its original path 702 by ($\Delta y$, $\Delta\theta_y$). And, after exiting the second set 726 of prisms, the optical beam 704 may be repositioned to a new position and angle relative to its second deflected path 706 by ($\Delta x$, $\Delta\theta_x$). The final position of the optical beam 704 on the target 708 may thus be offset from the original path 702 by $\Delta y$, and offset from the second deflected path 706 by $\Delta x$.

A more simplified representation of a prism is provided in FIG. 8, described below.

Figure 8:
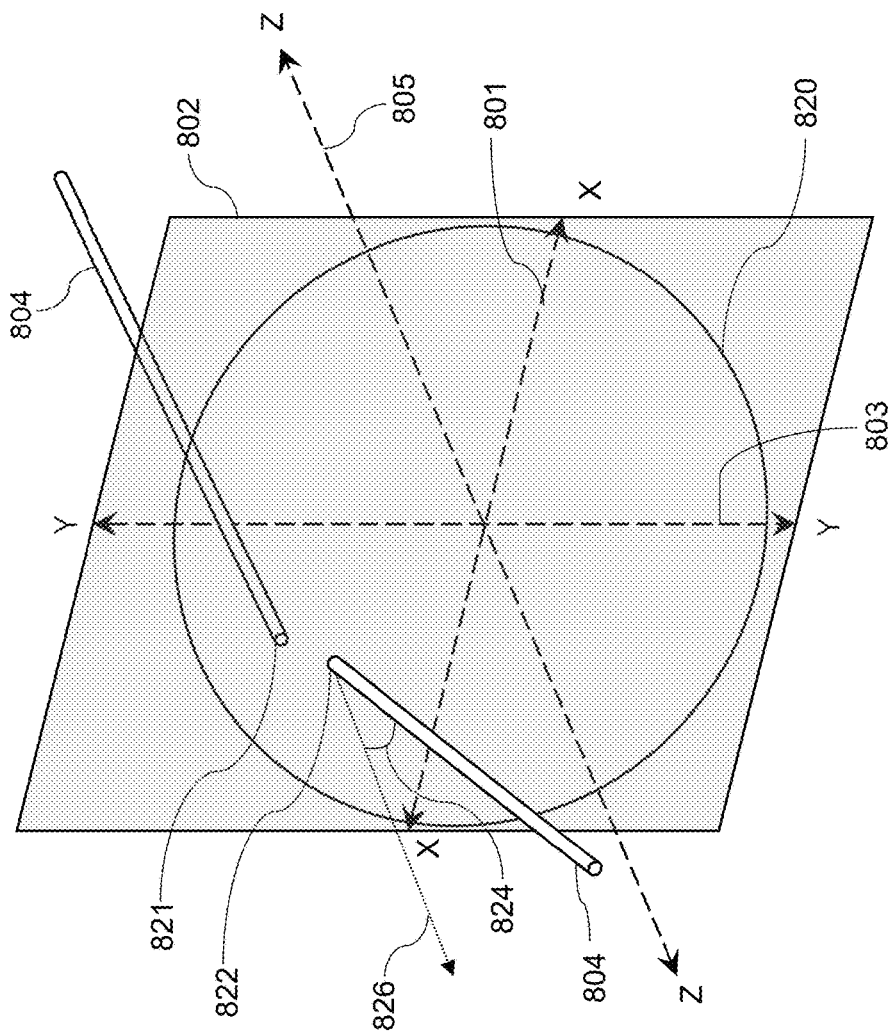
FIG. 8 illustrates an optical beam passing through a prism, in accordance with a representative embodiment.

FIG. 8 illustrates an optical beam 804 passing through a prism 820, in accordance with a representative embodiment. Specifically, the figure shows a representation of an optical beam 804 passing through a wedge prism 820, where the optical beam 804 is being deviated in both position and angle relative to an x-y plane 802. The x-y plane 802 may be aligned through a cross-section of the wedge prism 820, along the x-axis 801 and the y-axis 803, where the z-axis 805 intersects the x-y plane 802. It will be understood that the figure is merely a representation, and, as such, only a cross-section of a wedge prism 820 is shown, and it will be understood that the wedge prism 820 would include a depth in a real-world application.

As shown in the figure, the optical beam 804 may enter the wedge prism 820 at a first position 821 relative to the x-y plane 802 (i.e., having a first set of x-y coordinates), but the optical beam 804 may exit the wedge prism 820 at a second position 822 relative to the x-y plane 802 (i.e., having a second set of x-y coordinates that is different from first set of x-y coordinates). Thus, the position of the optical beam 804 may be controlled using the wedge prism 820. It will be understood that this position control may be accomplished using more than one wedge prism 820, and that the figure is merely provided by way of representation and for a general understanding of the present disclosure.

The optical beam 804 may also enter the wedge prism 820 at a first angle, e.g., substantially normal to the x-y plane 802 as shown in the figure, but the optical beam 804 may exit the wedge prism 820 at a second angle 824 relative to the x-y plane 802. Thus, the angle of the optical beam 804 may be controlled using the wedge prism 820, e.g., using a wedge angle or a deviation line of the wedge prism 820. As shown in the figure, the second angle 824 may be measured relative to a vector 826 that is normal to the x-y plane 802. The second angle 824 may also or instead be measured relative to the x-y plane 802 itself.

It will be understood, as described herein, certain implementations include four wedge prisms that are held in compact rotation mounts, and are electrically controlled such that an algorithm can be used to coordinate motion of the prisms such that the motion of an optical beam through the system can be controlled in each of two-dimensional angle and position.

It will also be understood that, in addition to the applications discussed herein, the present teachings may also or instead be used for other scanning and optical techniques where control over the angle and the position of an optical beam is desirous. For example, the present teachings could be used for precision alignment of a laser with an external source. By way of further example, the device could be used in reverse to align a laser with an ultra-cold gas cloud for precision laboratory measurements.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A device for positioning of an optical beam, comprising:
    a housing;
    at least four prisms aligned for passing the optical beam therethrough, each of the at least four prisms being rotatable relative to the housing;
    the at least four prisms comprising at least two sets of at least two prisms;
    each of the at least two sets of the at least two prisms comprising a Risely prism pair having an axis of rotation;
    the respective axes of rotation for at least two of the Risely prism pairs being collinear or in parallel;
    each of the Risely prism pairs being translatable relative to each other; and
    one or more positioners engaged with the Risely prism pairs, the one or more positioners being controllable to rotate the at least four prisms and/or to translate the Risely prism pairs, where rotation of the at least four prisms or translation of the Risely prism pairs adjusts a position and an angle of the optical beam passed therethrough relative to an x-y plane.

2. The device of claim 1, wherein the one or more positioners rotate the at least four prisms and/or translate at least one of the Risely prism pairs, to align the optical beam relative to a target.

3. The device of claim 2, wherein the target includes a fiber optic, and where the fiber optic remains substantially stationary while the device couples the optical beam with the fiber optic.

4. The device of claim 1, wherein each of the at least four prisms comprises a wedge prism.

5. The device of claim 1, wherein the one or more positioners are configured to rotate the at least four prisms and/or to translate at least one of the Risely prism pairs, according to feedback received from a sensor.

6. The device of claim 1, wherein rotation of the at least four prisms and translation of at least one of the Risely prism pairs provide four degrees of freedom for the optical beam.

7. The device of claim 1, wherein rotation of different prisms of the at least four prisms and translation of at least one the Risely prism pairs are coordinated.

8. The device of claim 1, wherein one or more of the at least four prisms is structurally configured to be moved independently from another one of the at least four prisms.

9. A system, comprising:
    a housing;
    at least four prisms aligned for passing an optical beam therethrough, with each of the at least four prisms being rotatable relative to the housing;
    the at least four prisms comprising at least two sets consisting of two prisms each, with the two prisms having a common axis of rotation;
    each of the at least two sets comprising a Risely prism pair;
    the respective common axes of rotation for at least two of the Risely prism pairs being collinear or in parallel;
    each of the Risely prism pairs being translatable with respect to each other; and one or more positioners engaged with the at least four prisms, with the one or more positioners being structurally configured to rotate the at least four prisms and to translate at least one of the Risely prism pairs; wherein rotation of the at least four prisms and/or translation of at least one of the Risely prism pairs adjusts a position and an angle of the optical beam passed therethrough relative to an x-y plane; and a controller comprising a processor and a memory, with the controller communicating with the one or more positioners to selectively activate the one or more positioners to rotate one or more of the at least four prisms and/or to translate one or more of the Risely prism pairs, according to instructions.

10. The system of claim 9, wherein the instructions are provided by the processor according to feedback received from one or more sensors.

11. The system of claim 9, wherein an algorithm determines the position and the angle of the optical beam.

12. A method, comprising:
aligning at least four prisms for passing an optical beam therethrough, with each of the at least four prisms being rotatable relative to a housing; wherein
the at least four prisms comprise at least two sets consisting of two prisms each;
each of the at least two sets of the two prisms comprise a Risely prism pair, with each of the Risely prism pairs being translatable relative to each other and having an axis of rotation, and
at least two of the axes of rotation being collinear or in parallel; and further comprising
passing the optical beam through the at least four prisms; and
adjusting a position and an angle of the optical beam by rotating one or more of the at least four prisms relative to the housing and/or by translating at least one of the Risely prism pairs relative to another of the Risely prism pairs.

13. The method of claim 12, further comprising calculating the position and the angle of the optical beam based on a position of one or more of the at least four prisms.

14. An apparatus for steering an optical beam using prisms comprising:
a plurality of Risely prisms, with each of the Risely prisms:
being for having the optical beam pass therethrough,
being comprised of a pair of component prisms, with the component prisms
being rotatable relative to each other about a common axis of rotation, and
being translatable with respect to each other; and
at least two of the Risely prisms having collinear or parallel common axes of rotation, whereby
upon passing through the Risley prisms, the optical beam intersects a target plane at an angle of incidence and at a location; and further comprising
both the angle of incidence and the location being controlled by rotating either or both of the component prisms for either or both of the Risely prisms, and/or by translating at least one of the Risely prisms with respect to another of the Risely prisms.

15. The optical beam steering apparatus of claim 14, wherein each of the component prisms is a wedge prism.

16. The optical beam steering apparatus defined in claim 14, further comprising:
a target on the target plane;
an angle of incidence and a location of incidence of an optical beam intersecting the target plane;
a sensor for sensing the location and the angle of incidence, and for generating a feedback signal comprised of a linear difference between the location and the target, and an angular difference between the angle of incidence and a desired angle of incidence; and
the component prisms for being respectively rotated responsive to the feedback signal and at least one of the Risely prisms for being translated with respect to another of the Risely prisms, responsive to the feedback signal, whereby
the optical beam is steered to intersect the target at the desired angle of incidence.

17. The optical beam steering apparatus defined in claim 14 wherein each of the component prisms is a wedge prism.

18. A device for steering an optical beam, comprising:
a housing;
at least four prisms aligned for passing the optical beam therethrough, each of the at least four prisms being rotatable relative to the housing;
the at least four prisms comprising at least two sets, with each of the sets consisting of two of the prisms;
each of the at least two sets comprising a Risely prism pair;
each of the Risely prism pairs being translatable relative to each other; and
one or more positioners providing the optical beam with four degrees of freedom by being capable of rotating each of the at least four prisms and translating the Risely prism pairs.

19. An apparatus for steering an optical beam, comprising:
a housing;
at least four prisms aligned for passing the optical beam therethrough, with each of the at least four prisms being rotatable relative to the housing;
the at least four prisms comprising at least two sets consisting of two prisms each;
each of the at least two sets of the two prisms comprising a Risely prism pair;
each of the Risely prism pairs being translatable with respect to each other; and
one or more positioners engaged with the at least four prisms, with the one or more positioners being structurally configured to rotate the at least four prisms and/or translate at least one of the Risely prism pairs;
rotation of the at least four prisms and translation of at least one of the Risely prism pairs providing four degrees of freedom for the optical beam; and
a controller comprising a processor and a memory, with the controller being for communicating with the one or more positioners to selectively activate the one or more positioners to rotate one or more of the at least four prisms and/or to translate one or more of the Risely prism pairs, according to instructions.

* * * * *